(12) United States Patent
Liu et al.

(10) Patent No.: US 11,627,836 B2
(45) Date of Patent: Apr. 18, 2023

(54) AUTOMATIC GRINDER AND GRINDING METHOD THEREOF

(71) Applicant: Shenzhen Elemex Technology, Ltd, Guangdong (CN)

(72) Inventors: Alex Liu, Beaverton, OR (US); Hongjin Liu, Guangdong (CN)

(*) Notice: Subject to any disclaimer, the term of this patent is extended or adjusted under 35 U.S.C. 154(b) by 197 days.

(21) Appl. No.: 16/979,518

(22) PCT Filed: Nov. 12, 2018

(86) PCT No.: PCT/CN2018/115046
§ 371 (c)(1),
(2) Date: Sep. 9, 2020

(87) PCT Pub. No.: WO2019/184378
PCT Pub. Date: Oct. 3, 2019

(65) Prior Publication Data
US 2020/0406266 A1 Dec. 31, 2020

(30) Foreign Application Priority Data
Mar. 27, 2018 (CN) .......................... 201810260452.1

(51) Int. Cl.
*A47J 42/46* (2006.01)
*A47J 42/06* (2006.01)
*A47J 42/36* (2006.01)

(52) U.S. Cl.
CPC ............... *A47J 42/46* (2013.01); *A47J 42/06* (2013.01); *A47J 42/36* (2013.01)

(58) Field of Classification Search
CPC .. A47J 42/00; A47J 42/06; A47J 42/36; A47J 42/46
See application file for complete search history.

(56) References Cited

U.S. PATENT DOCUMENTS

| | | | |
|---|---|---|---|
| 2,394,048 | A | 2/1946 | Farfan |
| 2,738,930 | A | 3/1956 | Schneider |

(Continued)

FOREIGN PATENT DOCUMENTS

| | | |
|---|---|---|
| CN | 201119802 Y | 9/2008 |
| CN | 101849648 A | 10/2010 |

(Continued)

OTHER PUBLICATIONS

Examination Report of counterpart Indian Patent Application No. 202017039661 dated Jan. 18, 2021.

(Continued)

*Primary Examiner* — Faye Francis (57) ABSTRACT

An automatic grinder and a grinding method thereof. The grinder includes a control structure and at least one material container assembly. The control structure includes a driving assembly and a connecting structure connected thereto. The material container assembly includes a material container body (20), a grinding head (22) fixedly connected to the material container body (20), and a grinding sleeve (25) rotatably connected to the grinding head (22). A recess (201) is provided on the material container body (20), engaged with the connecting structure. The grinding head (22) is fitted into the grinding sleeve (25), defining therebetween a material compartment (40) for accommodating a material. The driving assembly drives the material container body (20) to rotate. The material container body (20) drives the grinding head (22) to rotate. The grinding head (22) moves relative to the grinding sleeve (25), such that the material therebetween is ground into powder.

18 Claims, 9 Drawing Sheets

(56) References Cited

U.S. PATENT DOCUMENTS

| | | | |
|---|---|---|---|
| 4,135,672 A | 1/1979 | Schlessel | |
| 4,187,992 A | 2/1980 | Del Valle | |
| 5,865,384 A * | 2/1999 | Pai | A47J 42/02 241/101.3 |
| 6,830,206 B2 * | 12/2004 | Yang | A47J 42/46 241/168 |
| 6,929,201 B1 | 8/2005 | Blouse et al. | |
| 7,604,191 B2 * | 10/2009 | Pai | A47J 42/08 241/169.1 |
| 7,793,874 B2 | 9/2010 | Pai | |
| 11,291,335 B2 * | 4/2022 | Liu | A47J 42/06 |
| 2005/0023389 A1 * | 2/2005 | Wu | A47J 42/04 241/169.1 |
| 2013/0015279 A1 * | 1/2013 | So | A47J 42/04 241/169.1 |
| 2013/0026269 A1 * | 1/2013 | Pai | A47J 42/40 241/285.3 |
| 2013/0221144 A1 * | 8/2013 | Zhang | A47J 42/08 241/169.1 |
| 2014/0312152 A1 * | 10/2014 | Pai | A47J 42/46 241/169.1 |
| 2016/0106262 A1 | 4/2016 | Mroue | |
| 2017/0258272 A1 * | 9/2017 | Pai | A47J 42/02 |
| 2018/0325320 A1 * | 11/2018 | Guo | A47J 31/42 |
| 2021/0187514 A1 * | 6/2021 | Liu | B02C 19/0018 |
| 2022/0015577 A1 * | 1/2022 | Kelson | A47J 42/46 |

FOREIGN PATENT DOCUMENTS

| | | |
|---|---|---|
| CN | 201686886 U | 12/2010 |
| CN | 101953400 A | 1/2011 |
| CN | 102728444 A | 10/2012 |
| CN | 202683316 U | 1/2013 |
| CN | 202893409 U | 4/2013 |
| CN | 103842089 A | 6/2014 |
| CN | 204636015 U | 9/2015 |
| CN | 108543565 A | 9/2018 |
| CN | 208356880 U | 1/2019 |
| CN | 109746100 A | 5/2019 |
| DE | 29618748 U1 | 1/1997 |
| EP | 1466548 A1 | 10/2004 |
| EP | 3057710 B1 | 3/2018 |
| JP | 2006326119 A | 12/2006 |
| JP | 3189966 U | 4/2014 |
| RU | 2111696 C1 | 5/1998 |
| RU | 2641577 C1 | 1/2018 |
| WO | 9901222 A1 | 1/1999 |
| WO | 2005016097 A1 | 2/2005 |
| WO | 2015055161 A1 | 4/2015 |

OTHER PUBLICATIONS

International search report of PCT Patent Application No. PCT/CN2018/115046 dated Jan. 30, 2019.

Search report of counterpart European Patent Application No. 18912412.6 completed on Nov. 9, 2021.

Patent examination report 1 of counterpart New Zealand Patent Application No. 767469 dated Apr. 5, 2022.

Patent examination report 2 of counterpart New Zealand Patent Application No. 767469 dated Jun. 20, 2022.

* cited by examiner

AUTOMATIC GRINDER AND GRINDING METHOD THEREOF

CROSS REFERENCE TO RELATED APPLICATIONS

The present application is based on a Chinese patent application No. 201810260452.1 filed on Mar. 27, 2018, and claims its priority. The entire disclosure of the application is incorporated herein by reference in its entirety.

FIELD OF TECHNOLOGY

The present application relates to a grinder, and particularly to an automatic grinder and a grinding method thereof.

BACKGROUND TECHNOLOGY

The grinder and refiner used in real life, no matter a steel grinder or a ceramic grinder, usually make a material finer and finer by grinding and pressing the material between a moving grinding plate and a stationary grinding plate, so the production efficiency of the grinder and the fineness of ground material both depend on the degree of fitting between the moving grinding plate and the stationary grinding plate.

The grinding head and drive structure of existing grinders are not detachable. When grinding various powders, the second material can only be added into the grinding sleeve after the current process is completed, and the same grinding head is used. Taste of the ground powder may deteriorate due to air or particles introduced when feeding materials, and because the same grinding sleeve and grinding head are used to grind two materials, the taste of the powder of the second material may be affected by the previous material thus its quality becomes worse.

Therefore, it is necessary to design a new type of grinder, which uses different grinding sleeves and grinding heads when grinding multiple materials, and prevents the introduction of other particles when feeding, so as to ensure the taste of the materials.

SUMMARY

An objective of the present application is to provide an automatic grinder and a grinding method thereof, in order to overcome the defects in the prior art.

In order to achieve the above-mentioned objective, the present application provides an automatic grinder, which includes a control structure and at least one material container assembly. The control structure includes a driving assembly and a connecting structure connected to the driving assembly. The material container assembly includes a material container body, a grinding head fixedly connected to the material container body, and a grinding sleeve rotatably connected to the grinding head. A recess is provided on the material container body, and the connecting structure is engaged with the recess. The grinding head is fitted into the grinding sleeve, and the grinding head and the grinding sleeve define therebetween a material compartment for accommodating a material. The driving assembly drives, via the connecting structure, the material container body to rotate. The material container body drives the grinding head to rotate. The grinding head moves relative to the grinding sleeve, such that the material between the grinding head and the grinding sleeve is ground into powder.

Further, a transmission frame is disposed in the material container body, the transmission frame is provided with a connecting column connected to the grinding head.

Further, a lower end of the connecting column is in threaded connection with an adjusting structure for adjusting the size of the gap between the grinding head and the grinding sleeve, the adjusting structure includes an adjusting rod and an adjusting spring sleeved on the adjusting rod, and the adjusting spring is inserted in the grinding head.

Further, the grinding head includes a truncated cone body and a plurality of grinding plates, the plurality of grinding plates are arranged at intervals around a lower end surface of the truncated cone body. The truncated cone body is provided therein with a slot for inserting therein the connecting column. The lower end surface of the truncated cone body is recessed inward to form an adjusting recess, and the adjusting spring is fitted in the adjusting recess.

Further, the material container assembly further includes a fixing frame, the fixing frame is provided with a positioning column, and the grinding sleeve is provided with a positioning groove into which the positioning column is inserted. The fixing frame is connected to the control structure.

Further, the control structure further includes a self-locking structure. The self-locking structure includes a self-locking body and lock switches, and the lock switches are connected to the self-locking body and the fixing frame, respectively.

Further, a guiding socket is provided inside the self-locking body, and the material container body is fitted in the guiding socket.

Further, the connecting structure includes a universal gear.

Further, the driving assembly includes a power supply, a motive force source, a transmission structure, and a switch, the switch is connected to the power supply, and the power supply, the motive force source, and the transmission structure are connected in sequence. The transmission structure is connected to the connecting structure, and a resetting spring is disposed between the transmission structure and the motive force source.

The present application further provides a grinding method of the automatic grinder, the method includes:

a grinding step: the driving assembly drives the material container body to rotate through the connecting structure, and the material container body drives the grinding head to rotate, the grinding head moves relative to the grinding sleeve, and the material is ground into powder between the grinding head and the grinding sleeve.

When grinding a second material, the material container assembly is separated from the driving assembly and replaced with another material container assembly, returning to the grinding step.

The advantageous effect of the present application compared to the prior art is that, in the automatic grinder of the present application, the driving assembly drives the material container body to rotate through the connecting structure, and the material container body drives the grinding head to rotate, the grinding head moves relative to the grinding sleeve, and the material is ground into powder between the grinding head and the grinding sleeve. The gap between the grinding head and the grinding sleeve is adjusted by the adjusting structure, so as to adjust the size of the particles. When grinding the second material, the material container assembly is separated from the driving assembly and replaced with another material container assembly, thus tastes of the two materials do not affect each other. In addition, a sealed space is formed between the grinding sleeve, the fixing frame and the transmission frame when feeding the material, thereby preventing the introduction of other particles. Therefore, when grinding multiple materials, different grinding sleeves and grinding heads are used, and impurities are avoided when feeding, so that the taste of the material is ensured.

The application will be further described below with reference to the accompanying drawings and specific embodiments.

DETAILED DESCRIPTION OF THE EMBODIMENTS

In order to more fully understand the technical content of the present application, the technical proposal of the present application is further described and explained in conjunction with detailed embodiments below, but is not limited thereto.

As shown in the specific embodiment in FIGS. 1 to 9, the automatic grinder provided in the present embodiment can be used indoor or outdoor. Different grinding sleeves 25 and grinding heads 22 are used when grinding multiple materials, and the introduction of other particles is prevented to ensure the taste of the material.

Figure 1:
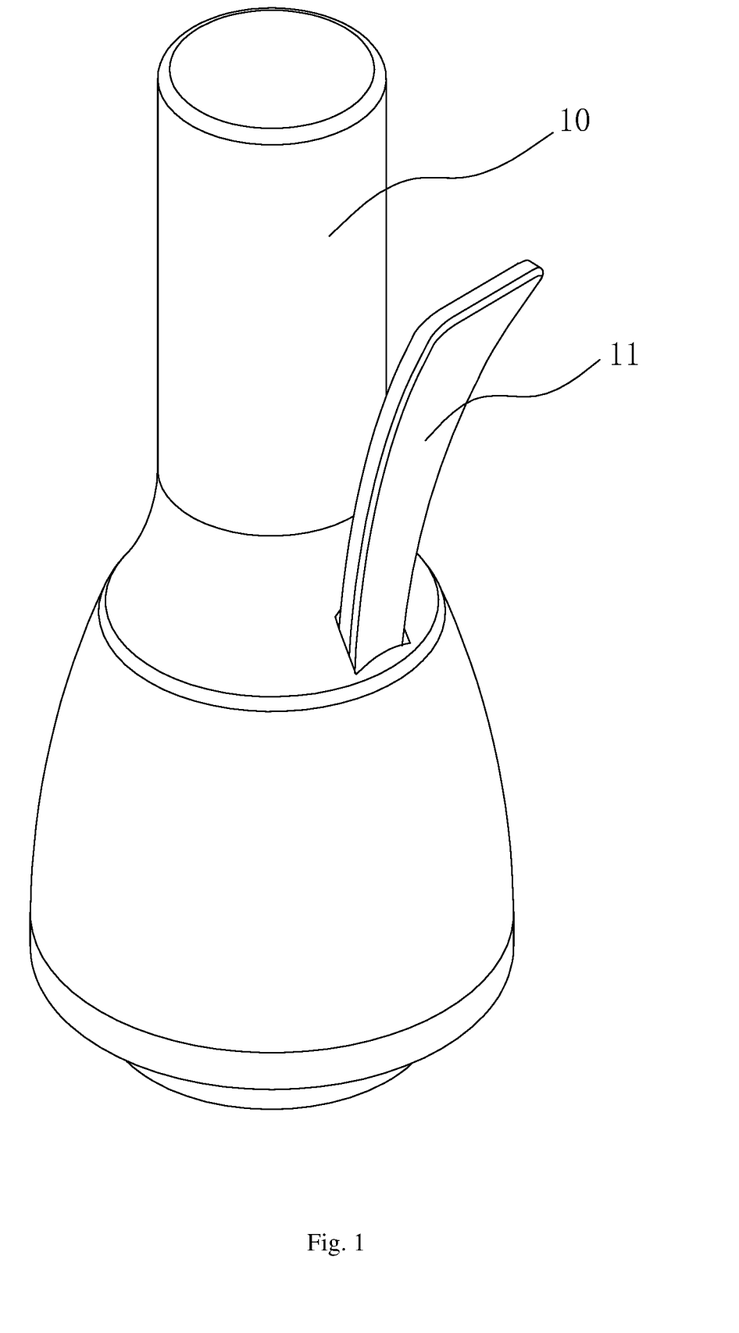
FIG. 1 is a perspective structural view of an automatic grinder in a specific embodiment of the present application.
Figure 2:
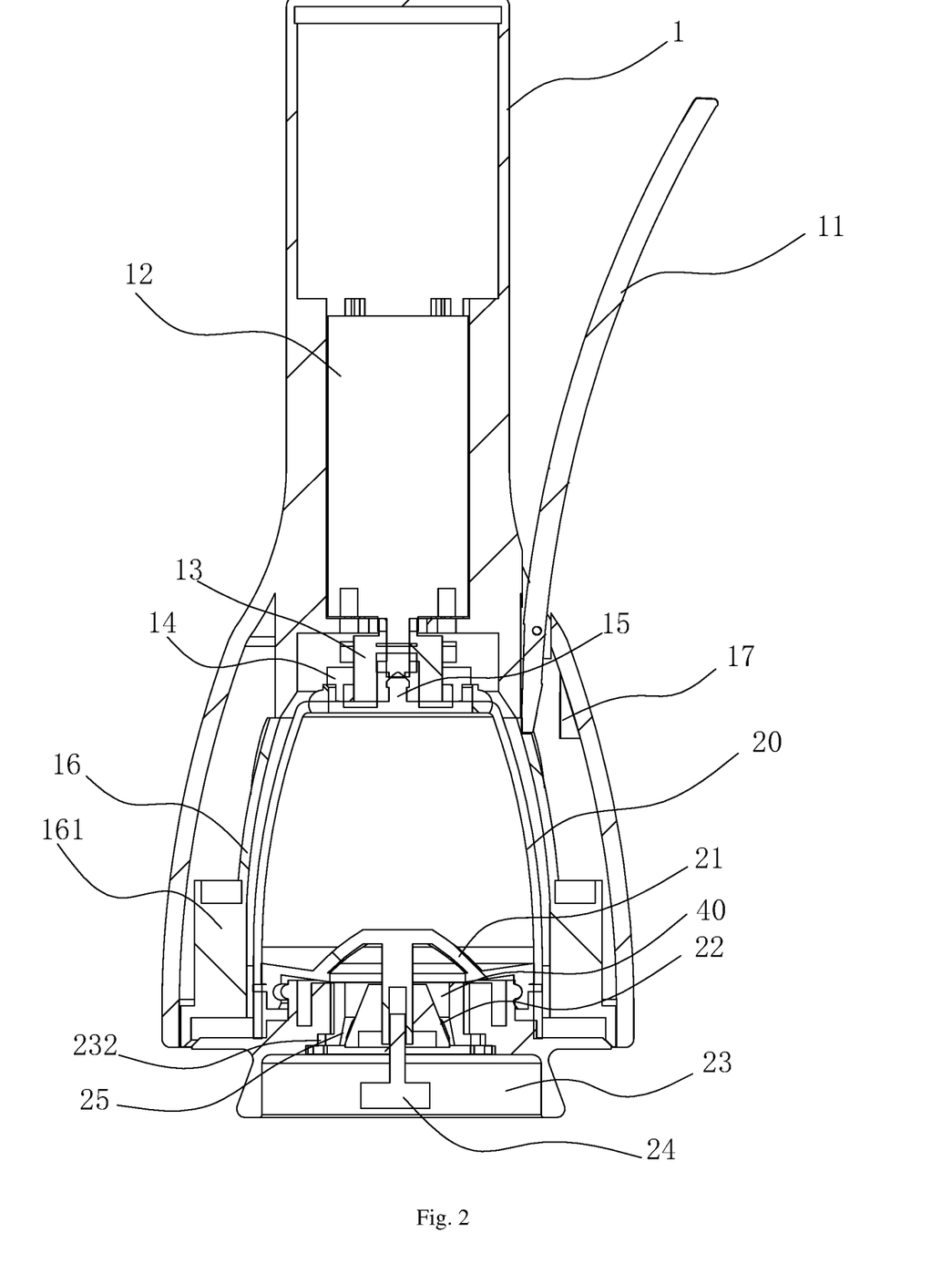
FIG. 2 is a cross-sectional structural view of the automatic grinder in the specific embodiment of the present application.
Figure 3:
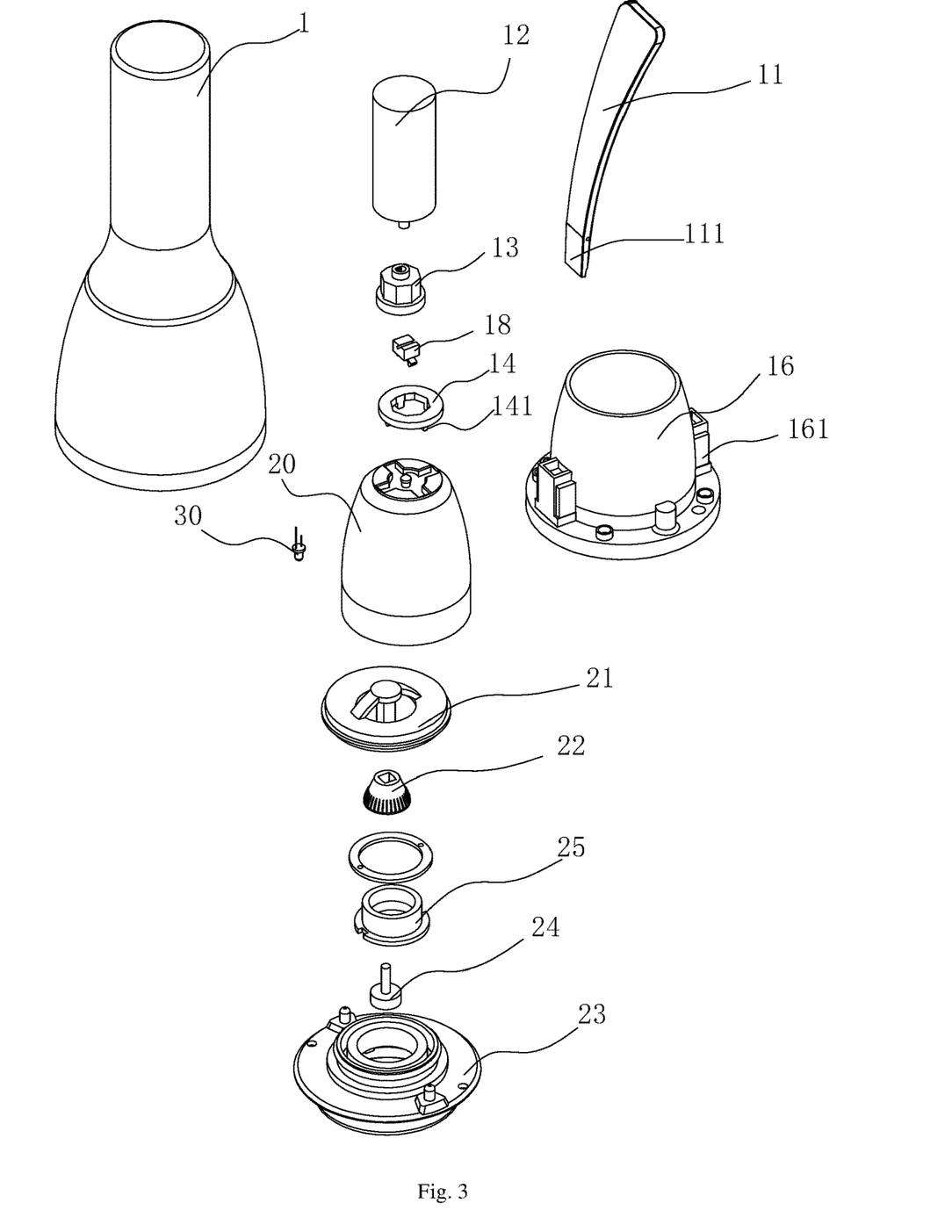
FIG. 3 is an exploded structural view of the automatic grinder in the specific embodiment of the present application.

As shown in FIG. 1, provided is an automatic grinder, which includes a control structure and at least one material container assembly. The control structure includes a driving assembly and a connecting structure connected to the driving assembly. The material container assembly includes a material container body 20, a grinding head 22 fixedly connected to the material container body 20, and a grinding sleeve 25 rotatably connected to the grinding head 22. A recess 201 is provided on the material container body 20, and the connecting structure is engaged with the recess 201. The grinding head 22 is fitted into the grinding sleeve 25, and the grinding head 22 and the grinding sleeve 25 define therebetween a material compartment 40 for accommodating a material. The driving assembly drives, via the connecting structure, the material container body 20 to rotate. The material container body 20 drives the grinding head 22 to rotate. The grinding head 22 moves relative to the grinding sleeve 25, such that the material between the grinding head 22 and the grinding sleeve 25 is ground into powder.

When grinding the second material, the material container assembly is separated from the driving assembly and replaced with another material container assembly, returning to the above-mentioned grinding step.

Figure 6:
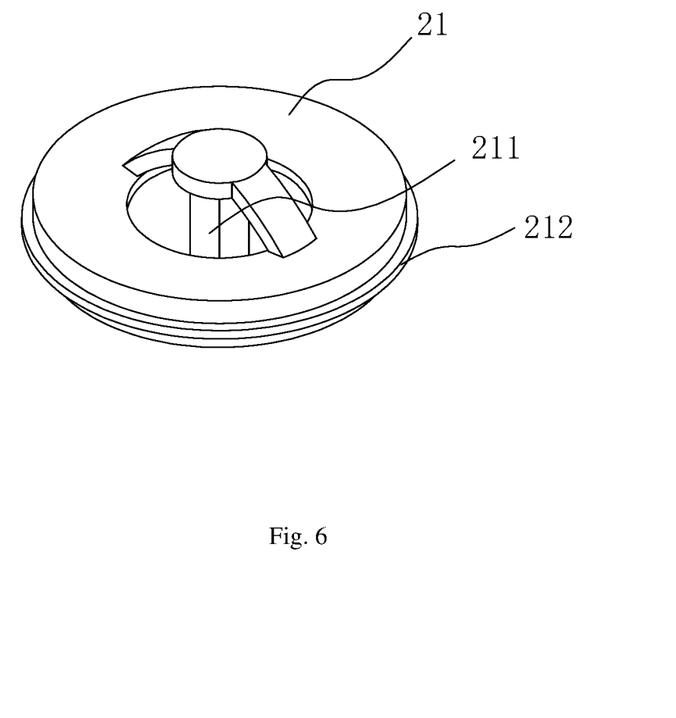
FIG. 6 is a perspective structural view of a transmission frame in the specific embodiment of the present application.

Additionally, as shown in FIG. 6, a transmission frame 21 is disposed in the material container body 20, and the transmission frame 21 is provided with a connecting column 211 connected to the grinding head 22. The transmission frame 21 is driven to rotate by the rotation of the material container body 20, and the grinding head 22 is rotated along with the rotation of the transmission frame 21 due to the connection with the connecting column 211.

Preferably, an outer periphery of the transmission frame 21 is provided with a protruded ring 212, while the above-mentioned material container body 20 is provided with a snapping groove, and the protruded ring 212 is inserted in the snapping groove to achieve the connection between the transmission frame 21 and the material container body 20, so that the rotation of the material container body 20 can drive the transmission frame 21 to rotate.

Preferably, a lower end of the connecting column 211 is in threaded connection with an adjusting structure for adjusting the size of the gap between the grinding head 22 and the grinding sleeve 25, the adjusting structure includes an adjusting rod 24 and an adjusting spring sleeved on the adjusting rod 24, and the adjusting spring is inserted in the grinding head 22.

When the adjusting rod 24 is rotated and moves upward, the adjusting spring is compressed by the adjusting rod 24 to force the grinding head 22 to move upward, and the gap between the grinding head 22 and the grinding sleeve 25 becomes smaller, thus the ground powder becomes finer. When the adjusting rod 24 is rotated and moves downward, the pressing force of the adjusting rod 24 on the adjusting spring is reduced, so that the grinding head 22 moves downward, and the gap between the grinding head 22 and the grinding sleeve 25 becomes larger, thus the ground powder becomes coarser.

Figure 4:
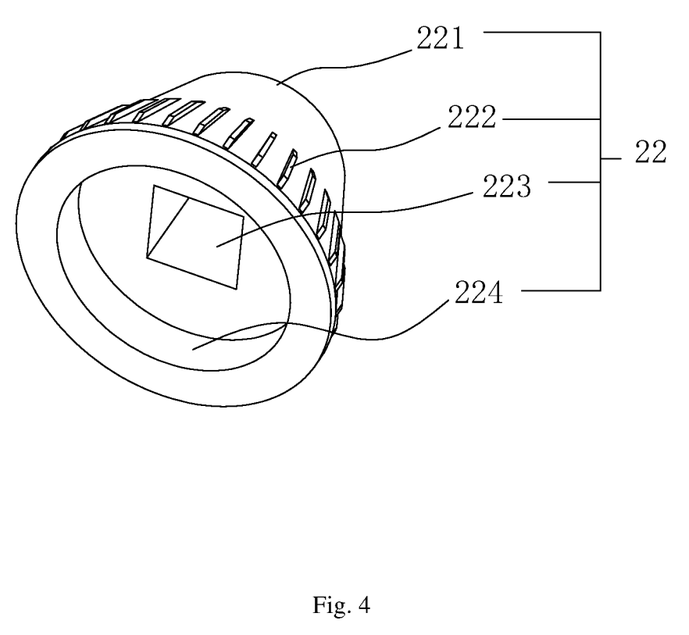
FIG. 4 is a perspective structural view of a grinding head in the specific embodiment of the present application.

Furthermore, as shown in FIG. 4, the above-mentioned grinding head 22 includes a truncated cone body 221 and a plurality of grinding plates 222, and the plurality of grinding plates 222 are arranged at intervals around a lower end surface of the truncated cone body 221. The truncated cone body 221 is provided with a slot 223 for inserting the connecting column 211. The lower end surface of the truncated cone body 221 is recessed inward to form an adjusting recess 224, and the adjusting spring is fitted in the adjusting recess 224. The material is pressed and ground through the cooperation between the grinding plates 222 and the grinding sleeve 25 to obtain powder.

In the present embodiment, the above-mentioned connecting column 211 has a cuboid shape. In other embodiments, the above-mentioned connecting column 211 may also have other shapes, such as a pentagonal shape, and the shape of the slot 223 matches with the shape of the connecting column 211 for easy installation.

Figure 5:
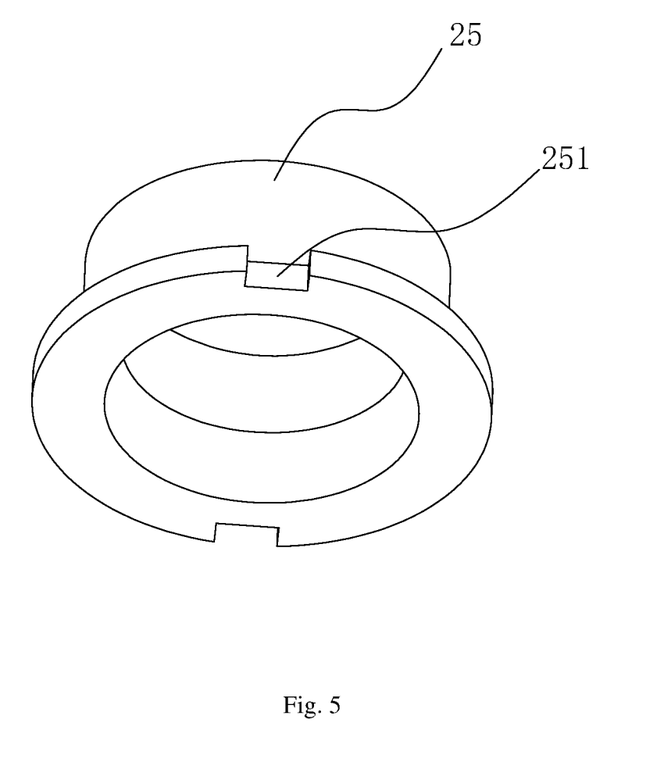
FIG. 5 is a perspective structural view of a grinding sleeve in the specific embodiment of the present application.
Figure 7:
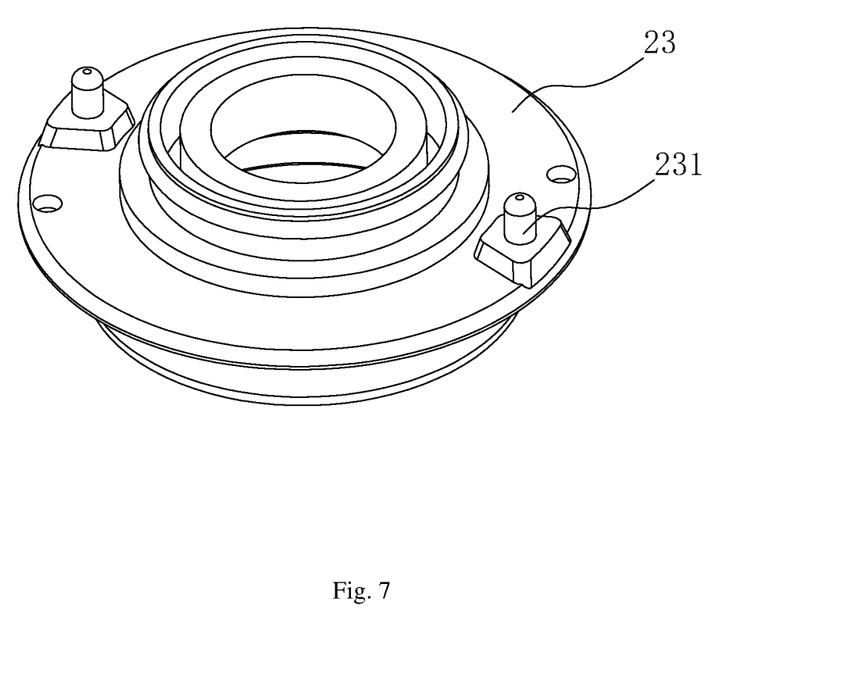
FIG. 7 is a perspective structural view of a fixing frame in the specific embodiment of the present application.

Furthermore, as shown in FIGS. 5 and 7, the material container assembly further includes a fixing frame 23, the fixing frame 23 is provided with a positioning column 232, and the grinding sleeve 25 is provided with a positioning groove 251 into which the positioning column 232 is inserted. The fixing frame 23 is connected to the control structure.

In addition, the control structure further includes a self-locking structure. The self-locking structure includes a self-locking body 16 and lock switches 161, and the lock switches 161 are connected to the self-locking body 16 and the fixing frame 23, respectively.

Preferably, the lock switches 161 are located in the center of the self-locking body 16, thereby connecting the self-locking body 16 and the fixing frame 23 at the middle position.

In other embodiments, the above-mentioned lock switches 161 are located on either side of the self-locking body 16 or at several positions on the outer periphery, and the self-locking body 16 and the fixing frame 23 are connected at the outer periphery.

The fixing frame 23 is provided with guiding columns 231 which are inserted in the lock switches 161. When the material container assembly is mounted, the guiding columns 231 of the fixing frame 23 trigger the lock switches 161, and the lock switches 161 lock the grinding sleeve 25 to fix the transmission base, thereby locking the material container assembly so that the material container assembly is prevented from falling off.

In addition, since the self-locking body 16 and the fixing frame 23 are in connection, that is, the grinding sleeve 25 is fixed, while the material container body 20 and the grinding head 22 are driven to rotate by the connecting structure, so that the grinding sleeve 25 and the grinding head 22 move relative to each other, thus the material can be ground and pressed.

Specifically, when the fixing frame 23 is connected to the self-locking body 16 under the action of the lock switches 161, the positioning column 232 of the fixing frame 23 is engaged with the positioning groove 251 of the grinding sleeve 25 as the self-locking body 16 stays still, therefore, the grinding sleeve 25 is also stationary. As the grinding sleeve 25 is stationary and the grinding head 22 is rotated clockwise, the grinding plates 222 grind the material into particles of the same size as the gap, and the particles fall off from the gap to finish grinding.

Additionally, a guiding socket is provided inside the self-locking body 16, and the material container body 20 is fitted in the guiding socket.

When the material container assembly is mounted, the guiding columns 231 of the fixing frame 23 are inserted into the guiding socket, and the universal gear 14 is in operation (rotating clockwise), so that the fixing frame 23 cannot operate and stays still, such that the grinding sleeve 25 cannot be rotated.

Furthermore, the driving assembly includes a power supply, a motive force source 12, a transmission structure, and a switch 11, the switch 11 is connected to the power supply, and the power supply, the motive force source 12, and the transmission structure are connected in sequence. The transmission structure is connected to the connecting structure, and a resetting spring is disposed between the transmission structure and the motive force source 12.

In the present embodiment, the above-mentioned power supply is a battery, the motive force source 12 is a motor, and the transmission structure is a transmission gear 13.

In addition, the automatic grinder further includes a housing 10, the above-mentioned self-locking structure is fitted in the housing 10, and the housing 10 is provided with a first contact piece 17 which is connected to the power supply. The switch 11 is a push switch 11, and an inner end of the push switch 11 is provided with a second contact piece 111. When the push switch 11 is pressed, the first contact piece 17 contacts the second contact piece 111, and the battery drives the motor to rotate, the motor operates (rotates clockwise) to drive the transmission gear 13 to rotate (clockwise), such that the transmission gear 13 drives the universal gear 14 to operate (rotate clockwise).

The above-mentioned control structure further includes a lamp 30. When the first contact piece 17 contacts the second contact piece 111, the lamp 30 is also connected to the power supply, so as to illuminate thereby allowing checking the grinding status.

Figure 9:
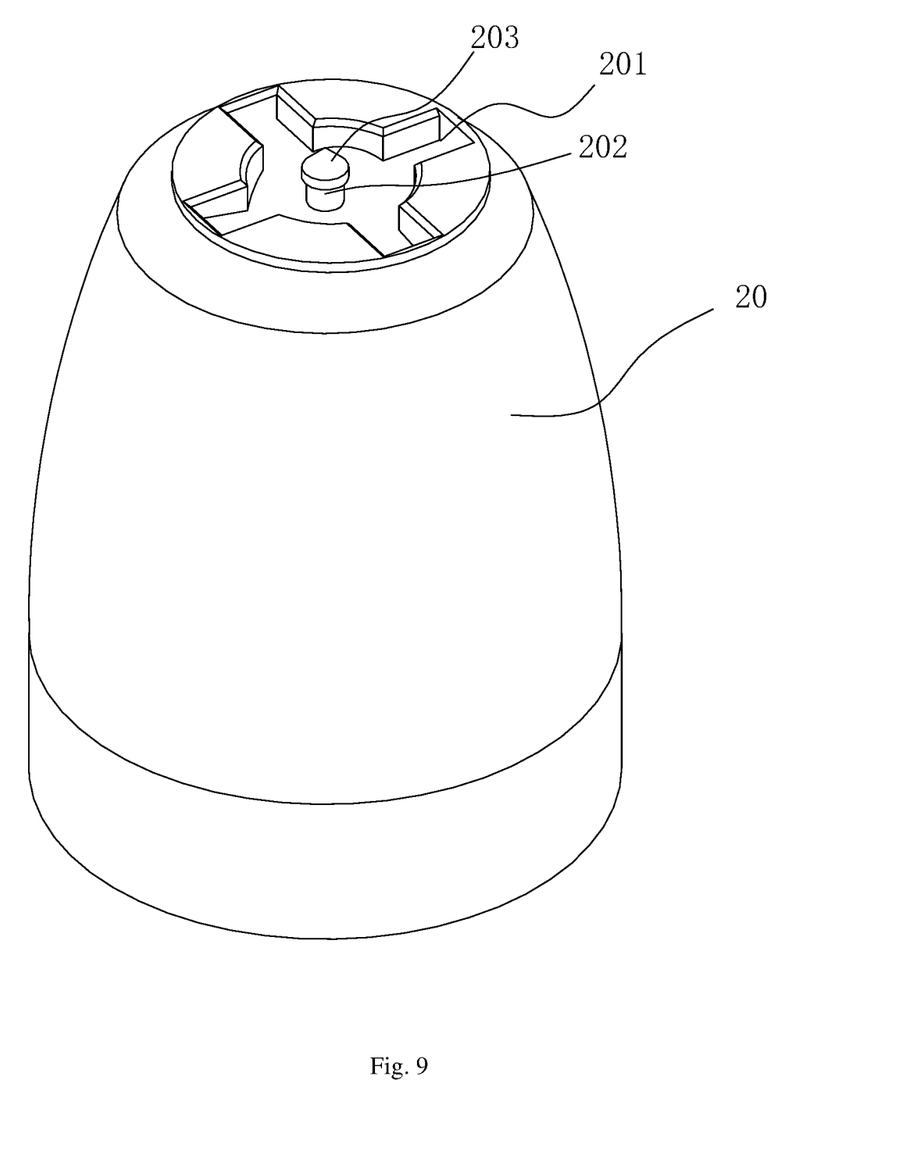
FIG. 9 is a perspective structural view of a material container body in the specific embodiment of the present application.

In addition, as shown in FIG. 9, the above-mentioned universal gear 14 is provided with a plurality of connecting rods 141, and an upper end of the material container body 20 is provided with a plurality of recesses 201 that cooperate with the connecting rods 141. When the four connecting rods 141 of the universal gear 14 and the four recesses 201 can be aligned to be connected with each other, the universal gear 14 can immediately drive the material container body 20 to rotate. When the four connecting rods 141 of the universal gear 14 and the four recesses 201 cannot be aligned and connected, the four connecting rods 141 of the universal gear 14 contact the upper end surface of the material container body 20, and the universal gear moves upward, so as not to hinder the upper end surface of the material container body 20 from fitting in. When the push switch 11 is pressed, the universal gear 14 is rotated, and when it is rotated to a position where the four connecting rods 141 of the universal gear 14 and the four recesses 201 can be aligned, the spring applies a downward force to force the four connecting rods 141 of the universal gear 14 and the four recesses 201 to be connected, so that the universal gear 14 and the material container body 20 can be rotated simultaneously.

Figure 8:
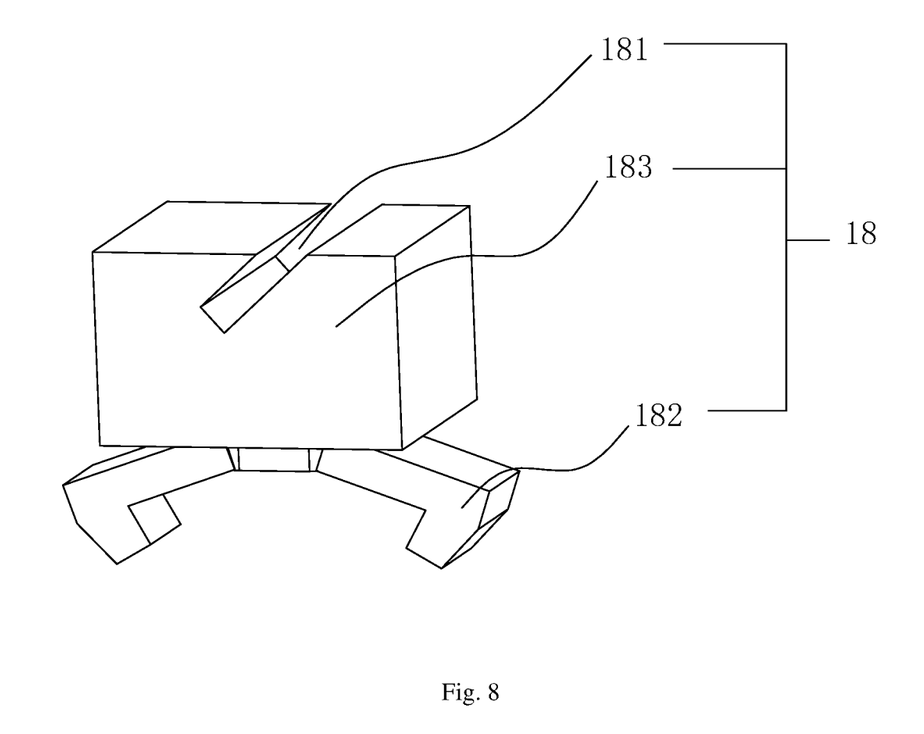
FIG. 8 is a perspective structural view of a clamping structure in the specific embodiment of the present application.

Preferably, as shown in FIG. 8, a lower end of the above-mentioned transmission gear 13 is equipped with a clamping structure 18, and the clamping structure 18 is surrounded by the plurality of connecting rods 141 around its outer periphery. The upper end surface of the material container body 20 is provided with a protrusion 202, and a tapered platform 203 is provided on a top end of the protrusion 202. The diameter of a bottom face of the tapered platform 203 is larger than the diameter of the cross section of the protrusion 202, that is, the protrusion 202 and the tapered platform 203 form a step therebetween. The clamping structure 18 includes a connecting block 183 and two clamping arms 182 between which the tapered platform 203 is clamped, and the connecting block 183 is formed with a groove 181 which is connected to the transmission gear 13 and is combined with the connecting rods 141, thereby forming a stable structure in which the center and the periphery are connected.

Furthermore, the above-mentioned groove 181 is inclined outwardly from top to bottom with a certain inclination angle, and the lower end of the transmission gear 13 is provided with a slanted bar to cooperate with the groove 181 to improve the stability of the connection.

In the above-mentioned automatic grinder, the driving assembly drives the material container body 20 to rotate through the connecting structure, and the material container body 20 drives the grinding head 22 to rotate, the grinding head 22 moves relative to the grinding sleeve 25, and the material is ground into powder between the grinding head 22 and the grinding sleeve 25. The gap between the grinding head 22 and the grinding sleeve 25 is adjusted by the adjusting structure, so as to adjust the size of the particles. When grinding the second material, the material container assembly is separated from the driving assembly and replaced with another material container assembly, thus tastes of the two materials do not affect each other. In addition, a sealed space is formed between the grinding sleeve 25, the fixing frame 23 and the transmission frame when feeding the material, thereby preventing the introduction of other particles. Therefore, when grinding multiple materials, different grinding sleeves 25 and grinding heads 22 are used, and impurities are avoided when feeding, so that the taste of the material is ensured.

Moreover, a grinding method of the automatic grinder is provided in the present application, which includes:

a grinding step: the driving assembly drives the material container body 20 to rotate through the connecting structure, and the material container body 20 drives the grinding head 22 to rotate, the grinding head 22 moves relative to the grinding sleeve 25, and the material is ground into powder between the grinding head 22 and the grinding sleeve 25.

When grinding the second material, the material container assembly is separated from the driving assembly and replaced with another material container assembly, returning to the grinding step above.

The above are merely examples to further illustrate the technical content of this application for easier understanding of readers, but are not intended to limit the implementation of this application. Any technical extension or re-creation made according to this application falls within the scope of protection of this application. The scope of protection of this application is subject to the claims.

The invention claimed is:

1. An automatic grinder, comprising a control structure and a material container assembly, wherein the control structure comprises a driving assembly and a connecting structure connected to the driving assembly, and the material container assembly comprises a material container body, a grinding head fixedly connected to the material container body, and a grinding sleeve rotatably connected to the grinding head, a recess is provided on the material container body, and the connecting structure is engaged with the recess, the grinding head is fitted into the grinding sleeve, and the grinding head and the grinding sleeve define therebetween a material compartment for accommodating a material, the driving assembly drives, via the connecting structure, the material container body to rotate, and the material container body drives the grinding head to rotate, the grinding head moves relative to the grinding sleeve, such that the material between the grinding head and the grinding sleeve is ground into powder.

2. The automatic grinder according to claim 1, wherein a transmission frame is disposed in the material container body, the transmission frame is provided with a connecting column connected to the grinding head.

3. The automatic grinder according to claim 2, wherein a lower end of the connecting column is in threaded connection with an adjusting structure for adjusting a size of a gap between the grinding head and the grinding sleeve, the adjusting structure includes an adjusting rod and an adjusting spring sleeved on the adjusting rod, and the adjusting spring is inserted in the grinding head.

4. The automatic grinder according to claim 3, wherein the grinding head includes a truncated cone body and a plurality of grinding plates, the plurality of grinding plates are arranged at intervals around a lower end surface of the truncated cone body, and the truncated cone body is provided therein with a slot for inserting therein the connecting column, the lower end surface of the truncated cone body is recessed inward to form an adjusting recess, and the adjusting spring is fitted in the adjusting recess.

5. The automatic grinder according to claim 1, wherein the material container assembly further comprises a fixing frame, the fixing frame is provided with a positioning column, and the grinding sleeve is provided with a positioning groove into which the positioning column is inserted, the fixing frame is connected to the control structure.

6. The automatic grinder according to claim 5, wherein a transmission frame is disposed in the material container body, the transmission frame is provided with a connecting column connected to the grinding head.

7. The automatic grinder according to claim 6, wherein a lower end of the connecting column is in threaded connection with an adjusting structure for adjusting a size of a gap between the grinding head and the grinding sleeve, the adjusting structure includes an adjusting rod and an adjusting spring sleeved on the adjusting rod, and the adjusting spring is inserted in the grinding head.

8. The automatic grinder according to claim 7, wherein the grinding head includes a truncated cone body and a plurality of grinding plates, the plurality of grinding plates are arranged at intervals around a lower end surface of the truncated cone body, and the truncated cone body is provided therein with a slot for inserting therein the connecting column, the lower end surface of the truncated cone body is recess inward to form an adjusting recess, and the adjusting spring is fitted in the adjusting recess.

9. The automatic grinder according to claim 5, wherein the control structure further comprises a self-locking structure, the self-locking structure comprises a self-locking body and lock switches, and the lock switches are connected to the self-locking body and the fixing frame, respectively.

10. The automatic grinder according to claim 9, wherein a transmission frame is disposed in the material container body, the transmission frame is provided with a connecting column connected to the grinding head.

11. The automatic grinder according to claim 10, wherein a lower end of the connecting column is in threaded connection with an adjusting structure for adjusting a size of a gap between the grinding head and the grinding sleeve, the adjusting structure includes an adjusting rod and an adjusting spring sleeved on the adjusting rod, and the adjusting spring is inserted in the grinding head.

12. The automatic grinder according to claim 11, wherein the grinding head includes a truncated cone body and a plurality of grinding plates, the plurality of grinding plates are arranged at intervals around a lower end surface of the truncated cone body, and the truncated cone body is provided therein with a slot for inserting therein the connecting column, the lower end surface of the truncated cone doggy is recessed inward to form an adjusting recess, and the adjusting spring is fitted in the adjusting recess.

13. The automatic grinder according to claim 9, wherein a guiding socket is provided inside the self-locking body, and the material container body is fitted in the guiding socket.

14. The automatic grinder according to claim 13, wherein a transmission frame is disposed in the material container body, the transmission frame is provided with a connecting column connected to the grinding head.

15. The automatic grinder according to claim 14, wherein a lower end of the connecting column is in threaded connection with an adjusting structure for adjusting a size of a gap between the grinding head and the grinding sleeve, the adjusting structure includes an adjusting rod and an adjusting spring sleeved on the adjusting rod, and the adjusting spring is inserted in the grinding head.

16. The automatic grinder according to claim 15, wherein the grinding head includes a truncated cone body and a plurality of grinding plates, the plurality of grinding plates are arranged at intervals around a lower end surface of the truncated cone body, and the truncated cone body is provided therein with a slot for inserting therein the connecting column, the lower end surface of the truncated cone body is recessed inward to form an adjusting recess, and the adjusting spring is fitted in the adjusting recess.

17. The automatic grinder according to claim 1, wherein the connecting structure comprises a universal gear.

18. The automatic grinder according to claim 17, wherein the driving assembly comprises a power supply, a motive force source, a transmission structure, and a switch, the switch is connected to the power supply, and the power supply, the motive force source, and the transmission structure are connected in sequence, the transmission structure is connected to the connecting structure, a resetting spring is disposed between the transmission structure and the motive force source.

* * * * *